(12) United States Patent
Xue et al.

(10) Patent No.: US 8,538,923 B2
(45) Date of Patent: Sep. 17, 2013

(54) METHOD, NODE AND SYSTEM FOR CONTROLLING VERSION IN DISTRIBUTED SYSTEM

(75) Inventors: Haiqiang Xue, Beijing (CN); Guangji Wang, Beijing (CN); Congxing Ouyang, Beijing (CN); Bing Wei, Beijing (CN)

(73) Assignee: China Mobile Communications Corporation, Beijing (CN)

( * ) Notice: Subject to any disclaimer, the term of this patent is extended or adjusted under 35 U.S.C. 154(b) by 140 days.

(21) Appl. No.: 13/139,455

(22) PCT Filed: Dec. 15, 2009

(86) PCT No.: PCT/CN2009/001459
§ 371 (c)(1),
(2), (4) Date: Aug. 12, 2011

(87) PCT Pub. No.: WO2010/069135
PCT Pub. Date: Jun. 24, 2010

(65) Prior Publication Data
US 2011/0289056 A1  Nov. 24, 2011

(30) Foreign Application Priority Data

Dec. 15, 2008 (CN) .......................... 2008 1 0239929

(51) Int. Cl.
*G06F 17/00* (2006.01)
(52) U.S. Cl.
USPC ....................................................... 707/638

(58) Field of Classification Search
USPC ........................................................ 707/638
See application file for complete search history.

(56) References Cited

U.S. PATENT DOCUMENTS 6,278,710 B1 * 8/2001 Eidson .......................... 370/394
2008/0147781 A1  6/2008 Hopmann et al.

FOREIGN PATENT DOCUMENTS

CN  101132270  2/2008
CN  101141334  3/2008

OTHER PUBLICATIONS

International Search Report issued for PCT/CN2009/001459, dated Mar. 25, 2010, 6 pages (with English translation).

* cited by examiner

*Primary Examiner* — Belix M Ortiz Ditren
(74) *Attorney, Agent, or Firm* — Fulbright & Jaworski LLP (57) ABSTRACT

A method, node and system for controlling version in a distributed system. Wherein, the method includes: a management node is selected from each domain of the distributed system; one is selected as the synchronization source of the distributed system from all the management nodes, and all the management nodes synchronize the time with that of the synchronization source; all the management nodes control the time synchronization of the nodes in their own domain according to the synchronized time; the nodes of the distributed system control the version of the duplicate copy of the storage data according to the synchronized time. According to the technical scheme, it can be realized that the rough time synchronization of the distributed system, the expansibility and the practicability are improved, and the defects of the distributed system in the prior art, such as the poor expansibility and practicability, are solved.

15 Claims, 7 Drawing Sheets

METHOD, NODE AND SYSTEM FOR CONTROLLING VERSION IN DISTRIBUTED SYSTEM

CROSS-REFERENCE TO RELATED APPLICATIONS

The present application is a U.S. National Stage of International Application No. PCT/CN2009/001459, filed Dec. 15, 2009, designating the United States and claiming priority to Chinese Patent Application No. 200810239929 filed Dec. 15, 2008, the disclosures of which are incorporated herein by reference.

FIELD OF THE INVENTION

The present invention relates to a core network in the field of communications and particularly to a method, node and system for version control in a distributed system.

BACKGROUND OF THE INVENTION

A distributed storage system is typically provided with a redundant data storage mechanism, that is, multiple copies of the same data are stored on different nodes, thereby benefiting from the advantages of high reliability of data storage, and a high throughput of data retrieval. Unfortunately, the issue of synchronizing the copies of the data, which may be referred to as version control, also exists.

In a centralized storage system, version control is relatively simple because the time when one of copies is modified recently is taken as a criterion and the recently modified copy is the latest version due to uniqueness of a clock source. However, it is relatively difficult to ensure highly precise synchronization of clocks at respective nodes in the distributed system and consequently very difficult to establish a method for version control of copies although this is a very important issue. For example, a balance of 10 Yuan is shown in a copy 1 of the account of a person, while a balance of 20 Yuan is shown in a copy 2 thereof, and at this time it may be difficult for the distributed system to determine an actual balance of the person. Therefore, version control is an issue highly desired to be addressed in the distributed system.

Figure 1:
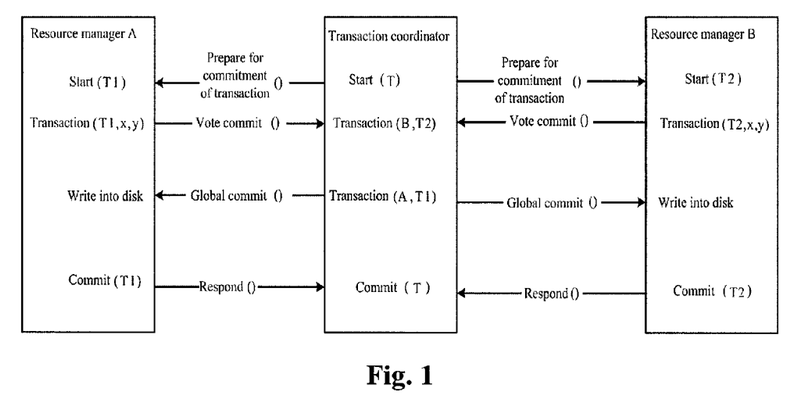
FIG. 1 illustrates a flow chart of the two-phase commitment protocol in the prior art.

Version control in "Advanced Replication" of the existing distributed system "Oracle" relies on a two-phase commitment protocol. FIG. 1 illustrates a flow chart of the two-phase commitment protocol in the prior art, and in the protocol as illustrated in FIG. 1, activities of respective resource managers are controlled by a separate software component of a transaction coordinator, which involves: the transaction coordinator instructs the resource managers to prepare for commitment of a transaction (Prepare), the resource managers respond to the transaction coordinator (Vote Commit), and the transaction coordinator collects respective responses of the resource managers (Global Commit) and notifies the resource managers of a result of the transaction and receives responses of the resource managers (ACK). As illustrated in FIG. 1, the version control method for Oracle is simple in which the time of the coordinator is taken as the version number of data, but it might be very likely to overwrite the latest data with earlier data during data recovery of the system if the coordinators were not temporarily synchronized. Therefore, temporary synchronization is required to address the issue of version synchronization in the two-phase commitment method, which may degrade usefulness of the system and make Two-Phase Commitment (2PC) very costly.

For updating in version control of the existing distributed redundant storage system, temporary synchronization methods generally include: master-slave temporary synchronization of relevance to the invention, temporary synchronization in the Byzantine protocol and convergent functional temporary synchronization, where the Network Time Protocol (NTP) has been mostly widely applied. In the master-slave temporary synchronization, there is a necessary stationary server which synchronizes its own time through a satellite or updates synchronously its own time over a connection to the Internet, and a client interacts with the server to synchronize its own time.

During making of the invention, the inventors have identified at least the following problems in the prior art.

1. Poor extensibility: the existing version control method for the distributed system is very demanding for clock synchronization and difficult to perform at the ten thousand-scale or hundred thousand-scale of the system.

2. Low usefulness of the system: the respective copies in the existing distributed system have to be kept the latest, and a flow of data modification, etc., fails if a node where any of the copies is located fails, but a failing node is very common in large-scale networking, and if each mirror image of the data is kept as the latest version, performance of the system may be degraded markedly to thereby greatly reduce usefulness of the system.

3. Poor applicability: the time is synchronized through a satellite or updated synchronously over a connection to the Internet for updating in version control of the existing distributed system, and the solution is relatively complex and of poor applicability.

4. High cost and considerable effort: temporal synchronization is relatively demanding for hardware in large-scale networking of the distributed system, and current temporal synchronization requires manual setting of master and backup clocks, so excessive dependency upon manual setting results in a considerable effort of large-scale networking.

SUMMARY OF THE INVENTION

In view of the drawbacks of poor extendibility, poor applicability, etc., of a distributed system in the prior art, a first object of the invention is to provide a method for version control in a distributed system so as to perform substantial temporal synchronization of and improve extendibility and applicability of the distributed system.

In view of the drawbacks of poor extendibility, poor applicability, etc., of a distributed system in the prior art, a second object of the invention is to provide a distributed version control system so as to perform temporal synchronization of and improve extendibility and applicability of the distributed system.

In view of the drawbacks of poor applicability, lack of temporal synchronization, etc., of a distributed system in the prior art, a third object of the invention is to provide a management node in a distributed system so as to perform temporal synchronization of and improve extendibility and applicability of the distributed system.

In view of the drawbacks of poor applicability, lack of exact temporal synchronization, etc., of a distributed system in the prior art, a fourth object of the invention is to provide a storage node so as to perform temporal synchronization of and improve extendibility and applicability of the distributed system.

To attain the first object, there is provided a method for version control in a distributed system according to an aspect of the invention.

The method for version control in a distributed system according to an embodiment of the invention includes: selecting a management node in each of domains of the distributed system; selecting one of the management nodes as a synchronization source of the distributed system and temporarily synchronizing the respective management nodes according to time of the synchronization source; controlling, by the respective management nodes, temporal synchronization of nodes in corresponding domains according to the synchronized time; and performing, by the nodes of the distributed system, version control on copies of stored data according to the synchronized time.

Preferably, the method for version control may further include: adding time identification information and/or operation version identification information to data stored in the distributed system and performing version control on multiple copies of the stored data according to the time identification information and/or the operation version identification information.

Particularly, the time identification information may include transmission time and reception time.

Specifically, performing version control on the copies of the data includes: modifying, retrieving or recovering N copies of the data, wherein W+R>N and N>=3, W is the least number of responses of successful modification received from the nodes where the copies are located, and R is the least number of retrieved copies with the same contents.

Preferably, selecting a management node in each of domains of the distributed system may include: selecting one of nodes in each of domains with the lowest or largest ID number or the longest online duration as a management node in the domain.

To attain the second object, there is provided a distributed version control system according to another aspect of the invention.

The distributed version control system according to an embodiment of the invention includes: management nodes selected from storage nodes in each of domains and configured to be temporarily synchronized to a synchronization source selected from the management nodes and responsible for temporary synchronization of the respective storage nodes in corresponding domains according to the synchronized time; and the storage nodes configured to perform version control on copies of stored data according to the synchronized time.

To attain the third object, there is provided a management node according to another aspect of the invention.

The management node according to an embodiment of the invention is selected in each of domains of a distributed system and includes: an interface module configured to interact with a synchronization source selected from management nodes, transmit a synchronization request message carrying request time T1, and acquire from a corresponding request response message time T2 when the synchronization source receives the request message and time T3 when the synchronization source responds to the request message; a calculation module configured to calculate a difference $\theta$ relative to a time system of the synchronization source from time T4 when the request response message is received and the time T1, T2 and T3 and adjust a time system of the management node by the relative difference for synchronization to the synchronization source; and a processing module configured to perform temporal synchronization of respective storage nodes in the domain where the management node is located according to the synchronized time.

To attain the fourth object, there is provided a storage node according to another aspect of the invention.

The storage node according to an embodiment of the invention includes: a temporary synchronization module configured to be temporarily synchronized to a management node selected in each of domains of a distributed system; a storage module configured to store data of the distributed system and the synchronized time; and a version control module configured to perform version control on copies of the stored data according to the synchronized time.

In the method, node and system for version control in a distributed system according to the respective embodiments of the invention, temporal synchronization is performed by selecting several management nodes, and then the management nodes control temporal synchronization of respective nodes in their domains for hierarchical synchronization so that clocks of the respective nodes synchronized in the system can be substantially synchronized to thereby perform temporal synchronization to some extent. Hereupon the respective nodes in the distributed system can perform version control, etc., according to the synchronized time. In the respective embodiments of the invention, neither high degree of clock synchronization nor a centralized control point configured to perform strict temporal synchronization of versions is required, so even if the number of nodes is increased to the ten thousand-scale or hundred thousand-scale, the system can still automatically perform effective temporal synchronization without manual configuration, exhibit good extensibility to the outside, achieve a high degree of autoimmunization and be applicable to a large-scale network.

In the respective embodiments of the invention, version control is performed further to temporal synchronization, inconsistency of multiple copies is allowed in the system, and the system can be enabled to automatically analyze and provide the latest data to the outside, thereby greatly improving usefulness of the distributed system and effectively addressing the drawbacks in the prior art of requiring the respective copies to be kept the latest, inoperability due to the failure of any node, poor applicability, etc.

The other features and advantages of the invention will be set forth in the following description and become apparent partly from the description or be learned by practicing the invention. The objects and other advantages of the invention can be attained and achieved in structures particularly pointed out in the description, claims and drawings.

The technical solutions of the invention will be further described in details hereinafter in the embodiments with reference to the drawings.

BRIEF DESCRIPTION OF THE DRAWINGS

The drawings are intended to provide further understanding of the invention, constitute a part of the description and serve together with the embodiments of the invention to explain but not limit the invention. In the drawings.

DETAILED DESCRIPTION OF THE EMBODIMENTS

Preferred embodiments of the invention are described hereinafter with reference to the drawings. It shall be noted that the preferred embodiments described here are merely intended to illustrate and explain but not limit the invention.

There are provided a method, node and system for version control in a distributed system according to embodiments of the invention, and the version control method, node and system according to the invention are described in detail hereinafter respectively with reference to FIGS. 2-11.

A First Embodiment

Figure 2:
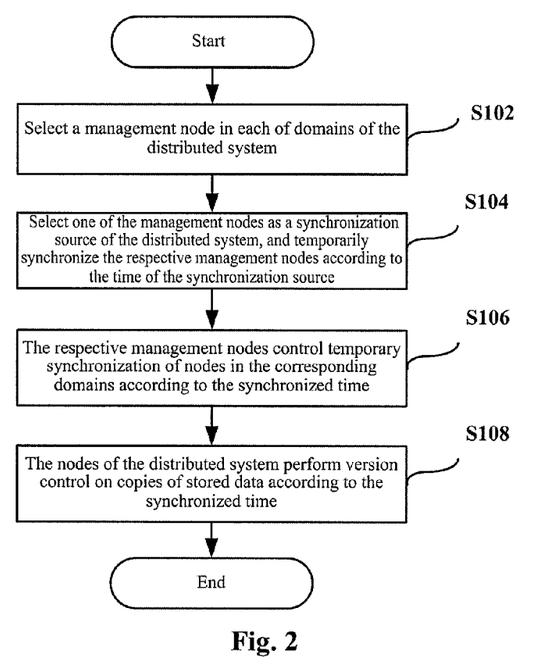
FIG. 2 illustrates a flow chart of a method for version control in a distributed system according to a first embodiment of the invention.

FIG. 2 illustrates a flow chart of a method for version control in a distributed system according to the first embodiment of the invention, and as illustrated in FIG. 2, the present embodiment includes operations S102-S108.

Operation S102: A management node is selected in each of domains of the distributed system.

Operation S104: One of the management nodes is selected as a synchronization source of the distributed system, and the respective management nodes are temporarily synchronized according to the time of the synchronization source.

Operation S106: The respective management nodes control temporary synchronization of nodes in the corresponding domains according to the synchronized time.

Operation S108: The nodes of the distributed system perform version control on copies of stored data according to the synchronized time.

In the present embodiment, a management node is selected in each of the domains of the distributed system, the respective management nodes are temporarily synchronized after a synchronization source is selected therefrom, and then the management node controls temporal synchronization of the respective nodes in its domain. With hierarchical synchronization in the present embodiment, clocks of the respective synchronized nodes in the system can be substantially synchronized for temporal synchronization to some extent. In the present embodiment, substantial temporal synchronization of the distributed system is kept by selecting a management node, and even if the number of nodes is increased to the ten thousand-scale or hundred thousand-scale, effective temporal synchronization can be performed automatically in the system without manual configuration to thereby exhibit good extensibility, achieve a high degree of automatization and apply to a large-scale network.

Figure 3:
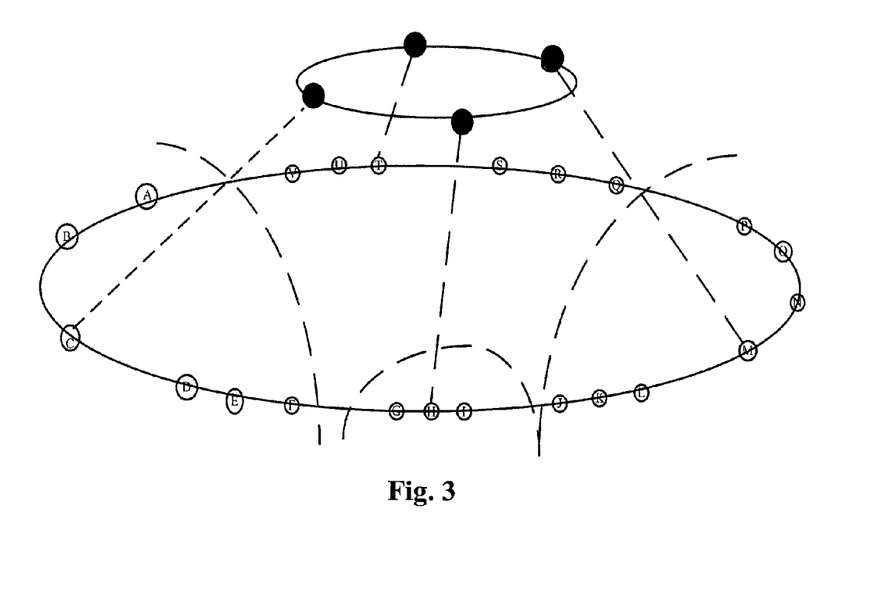
FIG. 3 illustrates a schematic diagram of selecting a management node in FIG. 2.
Figure 4:
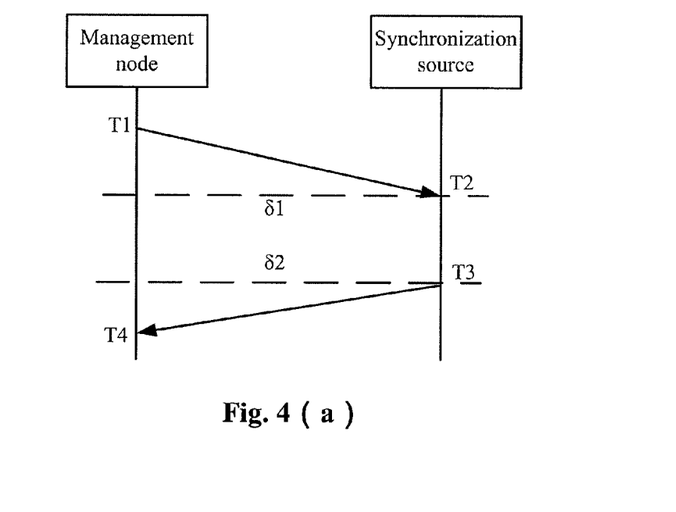
FIG. 4(a) illustrates a schematic diagram of temporal synchronization of a management node in a method for version control in a distributed system according to a second embodiment of the invention.
FIG. 4(b) illustrates a schematic diagram of temporal synchronization of a storage node in the method for version control in the distributed system according to the second embodiment of the invention.

FIG. 3 is a schematic diagram of selecting a management node in FIG. 2, and as illustrated in FIG. 3, the system includes nodes A, B, C . . . U and V, and the entire system may be divided into four domains, in each of which a management node is selected, where management nodes in FIG. 3 are the nodes C, H, M and T. The management nodes have no difference in hardware from other storage nodes in the domain except that they are responsible for synchronous management of the time of the storage nodes in the domains during temporal synchronization and the storage nodes are nodes actually responsible for storing data.

A management node may be selected in each of the domains in numerous ways. For example, one of the nodes in each of the domains with the lowest ID number or the longest online duration is selected as a management node of the domain. Alternatively, one of the nodes in the domain announces a request message for being a management node to the other nodes and is taken as a management node of the domain upon acceptance of the other respective nodes. A management node may be selected in numerous ways, and the invention is not limited to the foregoing two ways.

After the management nodes are selected, one of the management nodes may be selected as a synchronization source in the Operation S104, and likewise, the synchronization source may also be selected in a similar way of selecting a management node. The following description is presented of an example in which one of the management nodes with the longest online duration is selected as a synchronization source.

1) A management nodes may initiate a query request to a succeeding management node in a predefined sequence. In a national system in which the respective provinces are taken as a domain including a management node, for example, the respective management nodes are arranged sequentially in an uniform order of initial pinyin letters, and one of the nodes which is ranked first (i.e., with the leading pinyin) initiates a query request for an online duration. In the present embodiment, for example, the management node of the domain corresponding to Anhui province initiates a query request to which its own online duration and ID information are added.

2) The management nodes receiving the query request compares the online duration in the query request with its own online duration and passes to a succeeding management node the ID and online duration information in the query request if the online duration in the query request is longer than its own online duration or otherwise its own ID and online duration.

3) Upon reception of the returned message, the management node initiating the query request, e.g., the management node of Anhui province, acquires the ID and online duration information in the message, takes the management node corresponding to the ID in the message as a standard time synchronization source of the system and notifies the other management nodes of the selecting result, that is, transmits the ID number to the other management nodes.

The respective management nodes can be temporarily synchronized according to the time system of the synchronization source after the synchronization source is selected.

A Second Embodiment

FIG. 4(a) illustrates a schematic diagram of temporal synchronization of a management node in a method for version control in a distributed system according to the second embodiment of the invention, and FIG. 4(b) illustrates a schematic diagram of temporal synchronization of a storage node in the method for version control in the distributed system according to the second embodiment of the invention. A management node may be temporarily synchronized to a synchronization source in the same way of temporarily synchronizing a storage node in a domain to the management node.

As illustrated in FIG. 4(a), temporary synchronization of a management node to a selected synchronization source in the present embodiment includes:

1) The management node to be temporarily synchronized initiates to the synchronization source a synchronization request message carrying transmission time T1 of the synchronization request message, where the transmission time T1 is the time when the management node transmits the synchronization request message with reference to its own time system;

2) The synchronization source, upon reception of the synchronization request message, responds with a message carrying reception time T2 of the synchronization request message and time T3 of responding to the synchronization request message, where the reception time T2 is the time when the synchronization source receives the synchronization request message with reference to its own time system and the time T3 is the time when the synchronization source responds to the synchronization request message with reference to its own time system;

3) The management node records reception time T4 (with reference to its own time system) of the response message transmitted by the synchronization source upon reception of the response message; and 4) The management node calculates a difference θ relative to the time system of the synchronization source from the time T4, T1, T2 and T3.

The following parameters are defined as follows:
θ: the relative difference between the time systems of the synchronization source and the management node
δ1: a period of time consumed for propagation of the request message over the network
δ2: a period of time consumed for propagation of the response message over the network, assumed δ1=δ2, and then the following equations hold:

1) $T4 = T3 - \theta + \sigma 2$
2) $T2 = T1 + \theta + \sigma 1$
3) $\delta 1 = \delta 2$ Then $$\theta = \frac{(T2 - T1) - (T4 - T3)}{2}$$

$$\delta 1 = \delta 2 = \frac{(T2 - T1) + (T4 - T3)}{2}$$

After deriving the relative difference θ, the management node adds the difference θ to its own time to derive the time system temporarily synchronized to the synchronization source. During temporal synchronization in the foregoing method, the periods of time consumed for propagation over the network δ1=δ2 may also be derived for other purposes. For example, an administrator may determine, from the time delay, whether there is congestion over the network, or an node may set its own timer of transmission timeout according to the time delay, etc.

FIG. 4(b) illustrates a schematic diagram of temporal synchronization of a storage node in the method for version control in the distributed system according to the second embodiment of the invention. After the management node is temporarily synchronized to the synchronization source, the management node may be taken as a time synchronization source in a corresponding domain and temporarily synchronize respective storage nodes in the domain. As illustrated in FIG. 4(b), temporary synchronization of a storage node to a management node in the present embodiment includes:

1) Each of the storage nodes in the domain initiates to the management node a synchronization request message carrying transmission time T1' of the synchronization request message;

2) The management node responds to the synchronization request message with a response message carrying reception time T2' of the synchronization request message and time T3' of responding to the synchronization request message;

3) The storage node in the domain records reception time T4' of the response message upon reception of the response message; and 4) The storage node in the domain calculates, from the received time T4', T1', T2' and T3' the difference θ' relative to the time system of the management node.

Similarly to the foregoing calculation process, $$\theta' = \frac{(T2' - T1') - (T4' - T3')}{2}$$

and $$\delta 1' = \delta 2' = \frac{(T2' - T1') + (T4' - T3')}{2}$$

may be derived, and after deriving the relative difference θ', the storage node adds the difference θ' to its own time to derive the time system temporarily synchronized to the management node.

The management node has no difference in hardware from the other storage nodes in the domain except that the management node is responsible for synchronous management of the storage nodes in the domain during temporal synchronization and then may be taken as a normal node of the distributed system after temporal synchronization to participate in a subsequent version control process.

In the foregoing embodiment of the method, temporal synchronization is performed by selecting a management node, and clock synchronization is performed to some extent on the nodes throughout the network, so consistency of data can be ensured in a large-scale data storage system in such an application scenario as a Home Subscriber Server (HSS), and effective synchronous control can be performed even if the number of nodes is increased to the ten thousand-scale or hundred thousand-scale. Also the temporal synchronization can be easy to perform with a high degree of automatization in the respective embodiments of the invention.

A Third Embodiment

Figure 5:
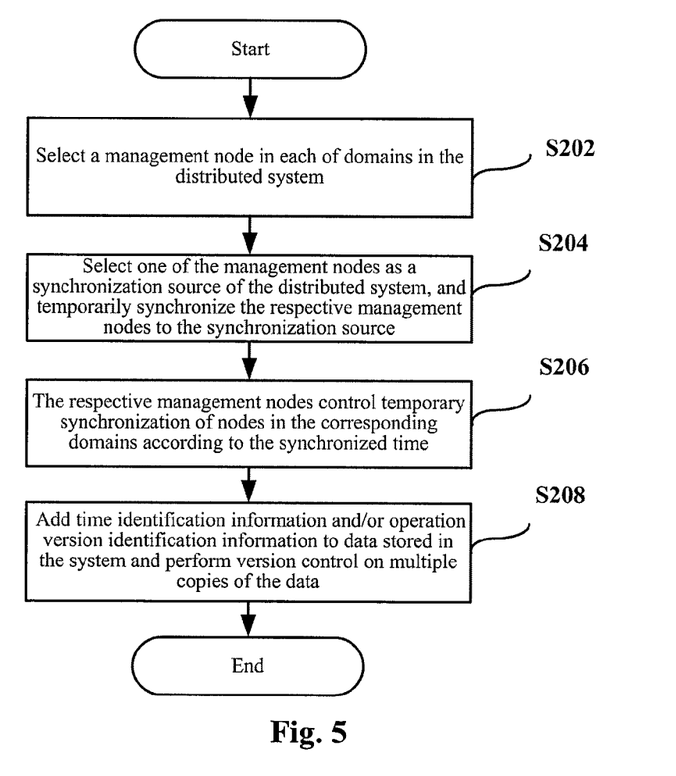
FIG. 5 illustrates a schematic flow chart of a method for version control in a distributed system according to a third embodiment of the invention.

FIG. 5 illustrates a schematic flow chart of a method for version control in a distributed system according to the third embodiment of the invention. As illustrated in FIG. 5, the present embodiment includes operations S202-S208.

Operation S202: A management node is selected in each of domains in the distributed system.

Operation S204: One of the management nodes is selected as a synchronization source of the distributed system, and the respective management nodes are temporarily synchronized according to the time of the synchronization source.

Operation S206: The respective management nodes control temporary synchronization of nodes in the corresponding domains according to the synchronized time.

Operation S208: Time identification information and/or operation version identification information are added to data stored in the system, and version control, e.g., retrieval, modification, or recovery, is performed on multiple copies of the data according to the information.

After temporal synchronization of the respective nodes in the distributed system, the time identification information or the operation version identification information or both is added to the stored data according to the time of the respective synchronized nodes to perform version control on the multiple copies of the data, for example, data with the latest time identification may be operated for retrieval, recovery or modification.

In the present embodiment, the time identification information of the data may include transmission time and reception time, where the transmission time is the time when a transmitter transmits the data to nodes where the multiple copies are located with reference to its own time, and the reception time is the time that the nodes where the multiple copies are located receive the data with reference to their own time systems. The relative storage periods of time of the data at the nodes where the copies are located may be calculated from the difference between the reception time and the transmission time.

In the foregoing embodiment, version control may be performed on the multiple copies of the data in numerous ways after the time identification information and/or the operation version identification information are added.

1. The data with the latest transmission time is taken as the latest data.

For the same data, for example, the transmission time of the data in a first copy is five minutes ago, and the transmission time of the data in other two copies is two minutes ago, so the data in the two copies may be considered as the latest data and subject to an operation of retrieval, modification, recovery, etc.

This way is applicable to temporal synchronization of the respective nodes throughout the network because the nodes are required to add the transmission time of the data with reference to their own time systems to ensure temporal synchronization.

2. The data with the shortest relative storage period of time is taken as the latest data.

For the same data, for example, the relative storage period of time of the data in a first copy is five minutes, and the relative storage period of time of the data in other two copies is two minutes, so the data in the two copies may be considered as the latest data and subject to an operation of retrieval, modification, recovery, etc.

Even if the data transmitter adds the consistent transmission time of the data, the reception time at the respective nodes where the multiple copies are located upon arrival at the nodes may be inconsistent due to a delay over the network so that the calculated relative storage periods of time may also be different. Therefore, this way is applicable to a situation in which the time delay is of less importance.

3. The data with the most recent operation version identification information is taken as the latest data.

The operation version identification information may be a version number of the data, and the data with the most recent version number is the latest data. In a specific implementation, the data may be modified while updating the number of times that the data has been modified, and one of the copies of the data with the largest number of times of being modified may be taken as the latest data.

4. The latest data is determined taking into consideration both the time identification information and the operation version identification information.

Version control may be performed on the latest data determined taking the foregoing three situations together into consideration in the case that the transmission time, the relative storage periods of time or the operation version identification information of the multiple copies of the data is the same.

In the present embodiment, temporal synchronization is performed by selecting a management node, and hereupon the time identification information and the operation version identification information are added to the data, and version control may be performed subsequently with the contents of the data to store, modify, retrieve, or recover the data in the storage system, thereby effectively performing version control with high applicability.

Version control may be performed with the time identification information and the operation version identification information after the respective nodes of the distributed system are temporarily synchronized according to the invention. The version control method according to the invention is described hereinafter by way of an example.

Version control performed after temporal synchronization according to the invention is applicable to a situation of storing N (N>=3) copies of data in the distributed system. Assumed N copies of data in the system, more than W responses of successful modification are received from the nodes where the copies are located, that is, W is the least number of responses of successful modification received from the nodes where the copies are located, and R is the least number of copies with the same contents, that is, more than R copies with the same contents are retrieved, so the configuration satisfying the condition of W+R>N may be referred to as legal configuration. In the distributed system, the number N of stored copies per data is predefined, so the relationship of W, R and N may be pre-configured in the system, and version control may be performed for retrieval and modification according to the legal configuration.

By way of an example, N=3, W=2 and R=2, where N=3 means that there are three copies of data in the system, W=2 means that successful modification by writing may be performed only if at least two of the copies are modified, and R=2 means that successful retrieval may be performed only if at least two of the copies are retrieved, therefore, the configuration is a legal configuration due to W+R>N. Likewise, both W=3 and R=2 and W=1 and R=4 are legal configuration for N=4.

A Fourth Embodiment

Figure 6:
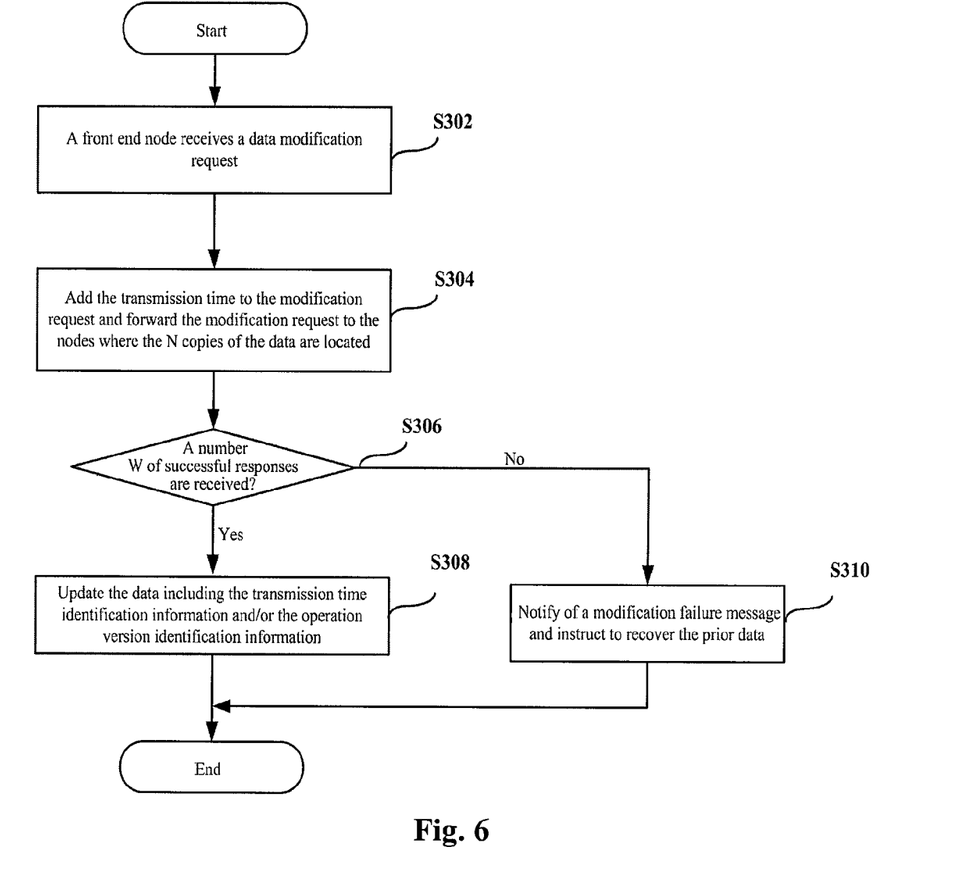
FIG. 6 illustrates a schematic flow chart of an embodiment of a method for version control in a distributed system according to the invention applied to data modification.

FIG. 6 illustrates a schematic flow chart of an embodiment of a method for version control in a distributed system according to the invention applied to data modification. As illustrated in FIG. 6, the present embodiment includes operations S302-S310.

Operation S302: A front end node in the distributed system receives a data modification request, where the front end node is one of normal storage nodes in the system that first receives the data modification request from outside of the system, and each of the storage nodes may be taken as a front end node. As illustrated in FIG. 3, the distributed system may appear like a loop chain to the outside, and when a modification request is transmitted to the distributed system from a outside system, one of nodes that first receives it is taken as a front end node, which acquires nodes where N copies of the data are located upon reception of the modification request.

Operation S304: Transmission time is added to the modification request, and the modification request is forwarded to the nodes where the N copies of the data are located, where the transmission time is the time when the front end node transmits the modification request with reference to its own clock.

Operation S306: The front end node determines whether a number W of successful responses have been received, if so, the process goes to Operation S308; otherwise, the process goes to Operation S310.

Operation S308: The transmission time and operation version identification information of the data are updated, and the process ends.

Operation S310: The front end node returns a data modification failure message and instructs the nodes where the copies are located to recover the data prior to the data modification failure.

The flow of the version control method applied to data modification in FIG. 6 is described below taking N=3, W=2 and R=2 as an example.

A. The front end node writes the transmission time into the data modification request with reference to its own clock and transmits the data modification request to the nodes where the three copies are located.

B. The front end node returns a modification success message to the outside upon reception of responses of successful modification returned from two or more of the nodes.

C. If two or more of the nodes where the copies are located are offline or return modification failure messages, the front end node returns a modification failure message to the outside and instructs the nodes to roll back the written data upon reception of less than two successful responses to the modification request.

D. The nodes successfully responding to the modification request write the transmission time and the reception time of the data and the contents in the data together into a database and modify the operation version identification information of the data. Taking the number of times of being modified as an example in the present embodiment, the number of times that the data has been modified is incremented by one each time the data is modified successfully, and the latest number of times of being modified is stored.

In the present embodiment, temporal synchronization is performed by selecting a management node, and thereafter version control is performed with the time identification and further the data in the storage system is stored and modified, thereby effectively performing version control with high applicability. In the version control method according to the present embodiment applied to data modification, the data is generated from the time identification information and the operation version identification information for version control, thereby performing effective version control at a lower cost over a large-scale network.

A Fifth Embodiment

Figure 7:
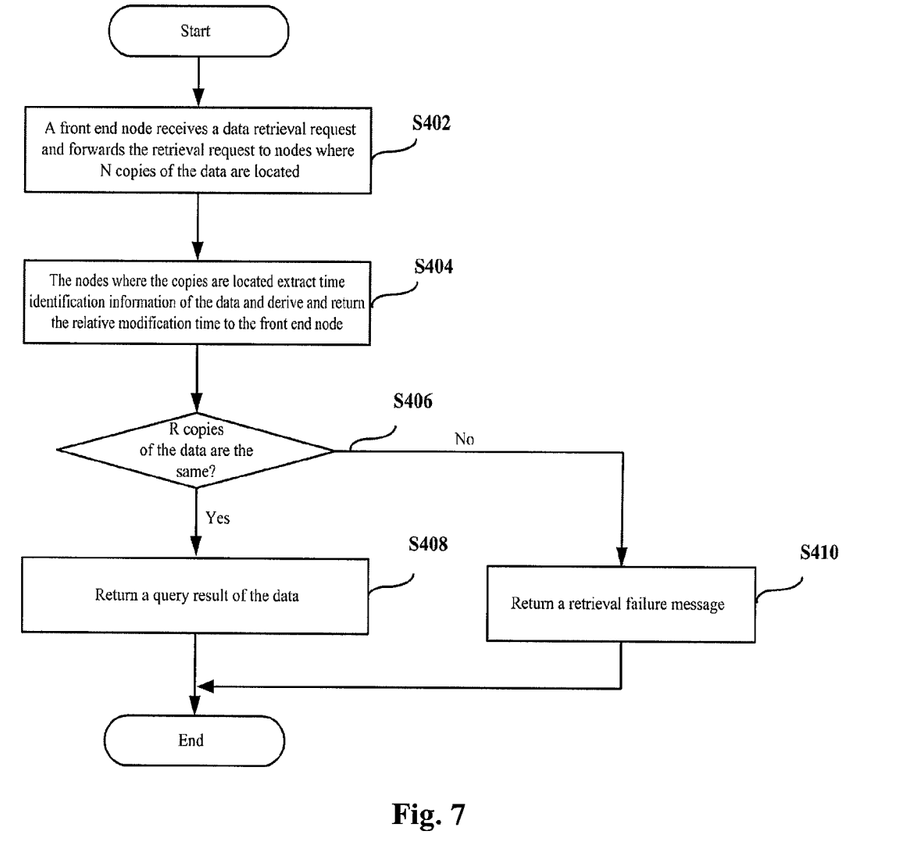
FIG. 7 illustrates a schematic flow chart of an embodiment of a method for version control in a distributed system according to the invention applied to data retrieval.

FIG. 7 illustrates a schematic flow chart of an embodiment of a method for version control in a distributed system according to the invention applied to data retrieval. As illustrated in FIG. 7, the present embodiment includes operations S402-S410.

Operation S402: A front end node receives a data retrieval request and forwards the retrieval request to nodes where N copies of the data are located.

Operation S404: The nodes where the copies are located extract time identification information of the data and derive and return the relative storage time to the front end node.

Operation S406: The front end node determines whether the nodes where more than R copies are located return the same data, if so, the process goes to Operation S408; otherwise, the process goes to Operation S410.

Operation S408: the front end node returns a query result of the data, and the process ends.

Operation S410: The front end node returns a retrieval failure result.

The flow of the version control method applied to data retrieval in FIG. 7 is described below still taking N=3, W=2 and R=2 as an example.

A. The front end node receives the data retrieval request and transmits the data retrieval request to the nodes where the three copies are located.

B. The nodes where the copies are located extract the transmission time and the reception time of the data, derive relative storage periods of time by subtracting the transmission time from the reception time and return them together with the number of times that the data has been modified to the front end node.

C. The front end node returns a retrieval failure message if two or more nodes do not respond or return retrieval failure messages.

D. If two or more nodes respond, the system compares the contents of the three copies of the data and returns the contents if the contents of two or all of the three copies of the data are the same or returns a retrieval failure message if the contents of any two of the three copies of the data are different, which indicates inconsistency of the data in the system.

To determine whether the data is the same, reference may be made to the four ways that version control is performed on the multiple copies of the data in numerous ways in the third embodiment: whether the returned data is the same may be determined from the transmission time, the number of times that the data has been modified, the relative storage period of time or a combination thereof.

In the present embodiment, temporal synchronization is performed by selecting a management node, and thereafter version control is performed with the time identification and operation version identification information and further the data in the storage system is retrieved, thereby effectively performing version control with high applicability. In the present embodiment, the operation version identification information is added, and whether the data is the same (i.e., synchronized) may be determined in version control from whether the time, the number of times that the data has been modified and the contents of the data are consistent. In the present embodiment, the problem of difficulty with precise temporal synchronization can be addressed and temporal synchronization to some extent can be performed, and in the present embodiment, inconsistency of the multiple copies is allowed in the system, and then the latest one of the copies of the data is selected therefrom in the system for provision to the user, thereby achieving error tolerance of and greatly improving applicability and extensibility of the system.

A Sixth Embodiment

Figure 8:
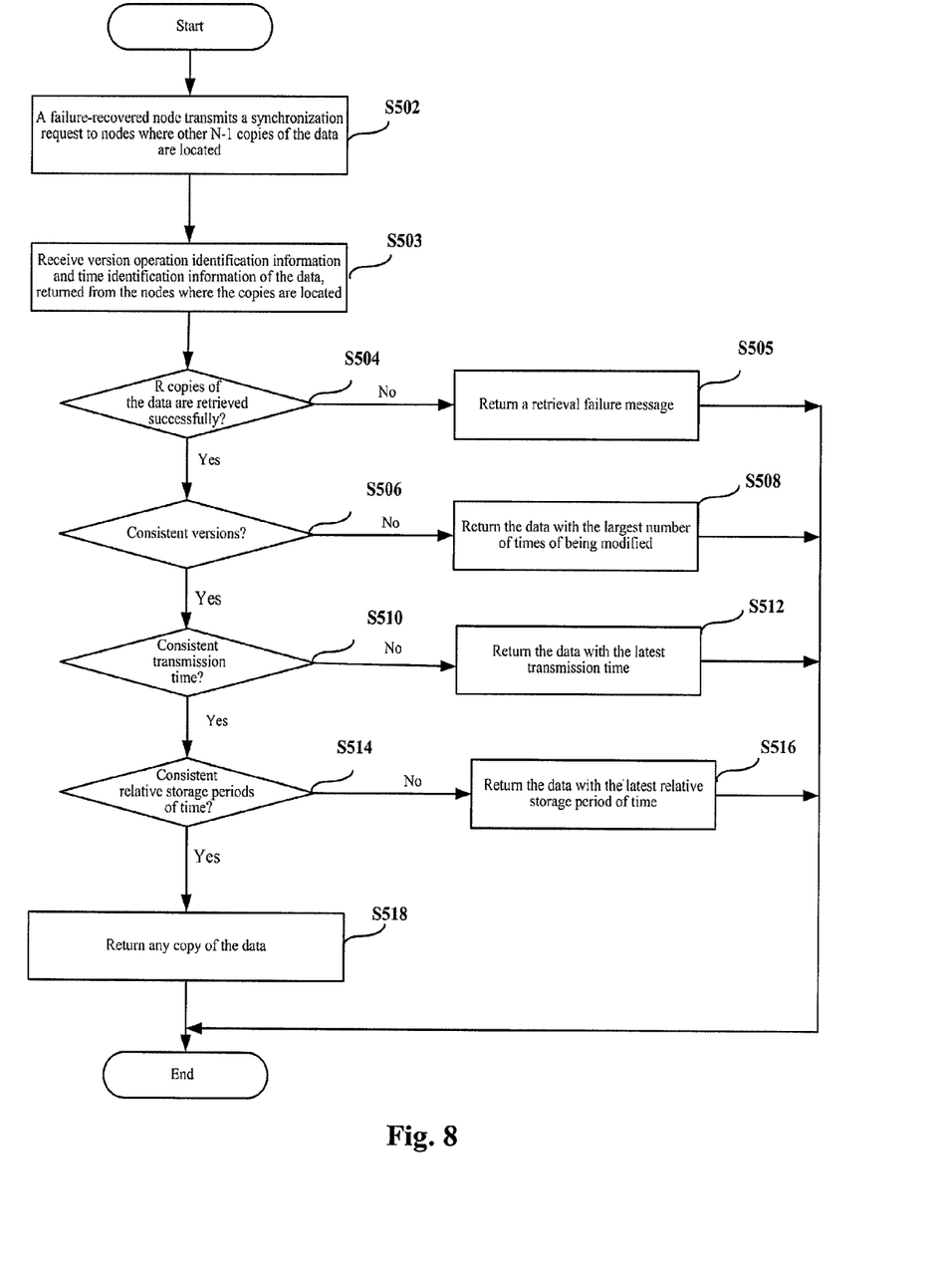
FIG. 8 illustrates a schematic flow chart of an embodiment of a method for version control in a distributed system according to the invention applied to data recovery.

FIG. 8 illustrates a schematic flow chart of an embodiment of a method for version control in a distributed system according to the invention applied to data recovery. As illustrated in FIG. 8, the present embodiment includes operations S502-S518.

Operation S502: A failure-recovered node transmits a synchronization request to nodes where other N−1 copies of the data are located.

Operation S503: The nodes where the copies are located extract and return time identification information and operation version identification information of the data to the failure-recovered node.

Operation S504: It is determined whether R copies of the data are retrieved successfully, and if so, the process goes to Operation S506; otherwise, the process goes to Operation S505.

Operation S505: A retrieval failure message is returned, the data recovery fails, and the process ends.

Operation S506: It is determined whether the versions of the R copies of the data are consistent, and if so, the process goes to Operation S510; otherwise, the process goes to Operation S508.

Operation S508: The data with the largest number of times of being modified is returned and used for data recovery at the failure-recovered node, and the data recovery ends.

Operation S510: It is determined whether the transmission time of the returned data is consistent, and if so, the process goes to Operation S514; otherwise, the process goes to Operation S512.

Operation S512: The data with the latest transmission time is returned as the latest data and used for data recovery at the failure-recovered node, and the data recovery ends.

Operation S514: It is determined whether the relative storage periods of time are consistent, and if so, the process goes to Operation S518; otherwise, the process goes to Operation S516.

Operation S516: The data with the shortest relative storage period of time is returned and used for data recovery at the failure-recovered node, and the data recovery ends.

Operation S518: Any of the copies of the data is returned and used for data recovery at the failure-recovered node, and the data recovery ends.

The flow of the version control method applied to data recovery in FIG. 8 is described below still taking N=3, W=2 and R=2 as an example.

A. All of the data stored on a node E has to be synchronized after failure recovery thereof, and copies of a certain piece of data stored on the node E exist on both of other two nodes E1 and E2.

B. The node E transmits a synchronization request to the nodes E1 and E2 and may be synchronized for data recovery only if both E1 and E2 respond.

C. The node E, upon reception of the responses, compares the number of times of being modified of the two copies, further the transmission time of the data when the number of times of being modified are the same and still further the relative storage periods of time when the transmission time of the data is the same, and acquires the latest data source therefrom for data synchronization.

D. The node E may serve the outside only if the data recovery is done.

Similarly to the fourth embodiment, data recovery control is performed with the time identification and operation version identification information after temporal synchronization is performed in the present embodiment, thereby effectively performing version recovery control with high applicability. In the present embodiment, the problem of difficulty with precise temporal synchronization can be addressed, temporal synchronization to some extent can be performed, and inconsistency of the multiple copies is allowed in the system, and then the latest one of the copies of the data is selected therefrom in the system for provision to the user, thereby achieving error tolerance of and greatly improving applicability and extensibility of the system.

The foregoing one or more embodiments of the method have the following advantageous effects.

1. The version control method for the existing distributed system tends to rely on precise clock synchronization throughout the network, but this is very difficult in a large-scale network. In the version control method according to the foregoing respective embodiments of the invention, the data is generated from the time identification and operation version identification information, and version control is facilitated also by comparing the contents of the data, thereby performing effective version control at a lower cost over the large-scale network.

2. The existing clock synchronization solution relies on manual configuration, thus resulting in a considerable effort of large-scale networking, and in the temporal synchronization method according to the foregoing respective embodiments, a synchronization source is selected automatically and clock synchronization operations are performed automatically with a high degree of automatization.

3. In the existing solution, it is very difficult to deploy a large-scale system, but the foregoing respective embodiments can be applied to a large-scale distributed redundant storage system at the hundred thousand-scale to achieve good extensibility of the system.

4. In the existing solution, the respective copies have to be kept the latest, and no successful operation can be performed once one of the nodes fails, thus degrading usefulness of the system, and in the foregoing respective embodiments, inconsistency of the multiple copies may be allowed in the system, and then the latest one of the copies will be selected therefrom in the system for provision to the user, thereby achieving error tolerance of and improving applicability of the system.

A Seventh Embodiment

Figure 9:
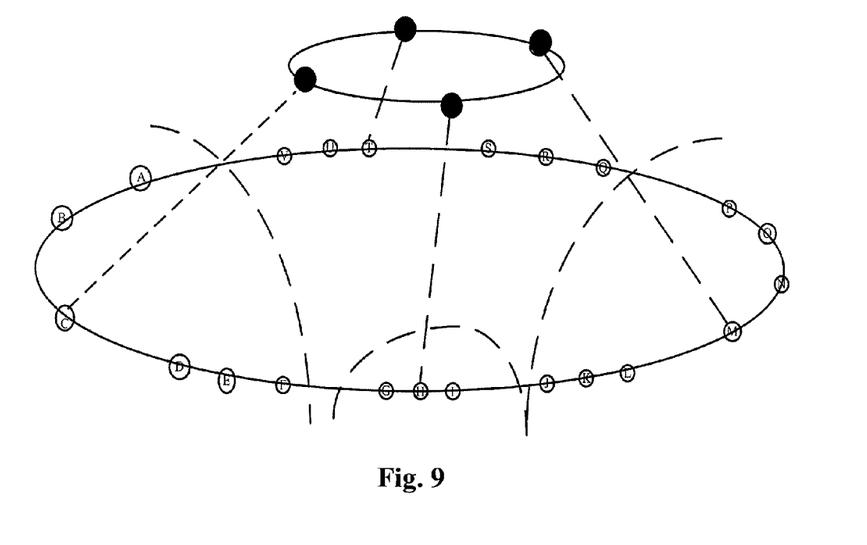
FIG. 9 illustrates a schematic diagram of a distributed version control system according to a seventh embodiment of the invention.

FIG. 9 illustrates a schematic diagram of a distributed version control system according to the seventh embodiment of the invention. As illustrated in FIG. 9, the present embodiment includes nodes A, B, C . . . U and V, where the nodes C, H, M and T are management nodes and the other nodes are storage nodes.

The management nodes are selected from the storage nodes in the respective domains and configured to be temporarily synchronized to a synchronization source selected from the management nodes and responsible for temporary synchronization of the respective storage nodes in the corresponding domains to the synchronized time. For details of being temporarily synchronized to the selected synchronization source and responsible for temporary synchronization of the storage nodes in the domains, reference may be made to the relevant description of temporary synchronization in the first, second and third embodiments of the invention.

The storage nodes are configured to be temporarily synchronized to the management nodes in the corresponding domains and to perform version control on copies of stored data according to the synchronized time. For temporary synchronization of the storage nodes to the management nodes, reference may be made to the relevant description of FIG. 4(b). The management nodes may join into the domains as normal storage nodes for version control at the end of system time synchronization. For a relevant description of version control, reference may be made to the relevant description of FIGS. 5-8, and a repeated description of the same or similar contents will be omitted here.

In the present embodiment, substantial temporal synchronization of the distributed system is kept by selecting a management node, and even if the number of nodes is increased to the ten thousand-scale or hundred thousand-scale, effective temporal synchronization can be performed automatically in the system without manual configuration to thereby exhibit good extensibility to the outside, achieve a high degree of automatization and apply to a large-scale network. Furthermore, in the version control method according to the present embodiment, inconsistency of the data may be allowed in the system, thereby improving applicability of the system.

An Eighth Embodiment

Figure 10:
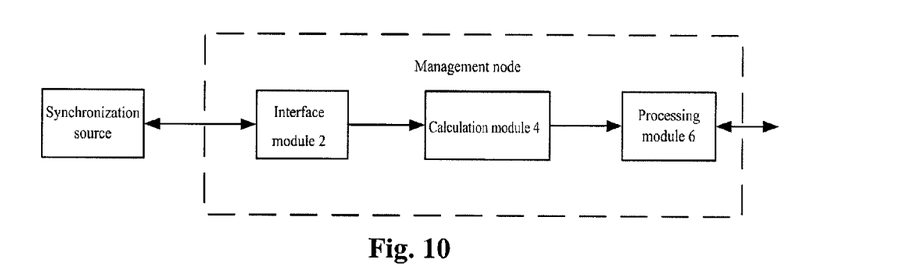
FIG. 10 illustrates a schematic structural diagram of an embodiment of a management node in FIG. 9.

FIG. 10 illustrates a schematic structural diagram of an embodiment of the management node in FIG. 9, and as illustrated in FIG. 10, the management node in the present embodiment includes:

an interface module 2 configured to interact with a synchronization source selected from management nodes, transmit a synchronization request message carrying request time T1, and acquire, from a corresponding request response message, time T2 when the synchronization source receives the request message and time T3 when the synchronization source responds to the request message;

a calculation module 4 configured to calculate a difference θ relative to the time system of the synchronization source from time T4 when the request response message is received and the time T1, T2 and T3 and adjust the time system of the management node by the relative difference for synchronization to the synchronization source; and a processing module 6 configured to perform temporal synchronization of respective storage nodes in a domain according to the synchronized time.

For a specific temporary synchronization process of the management node, reference may be made to the relevant description of synchronization in FIG. 4(a).

A Ninth Embodiment

Figure 11:
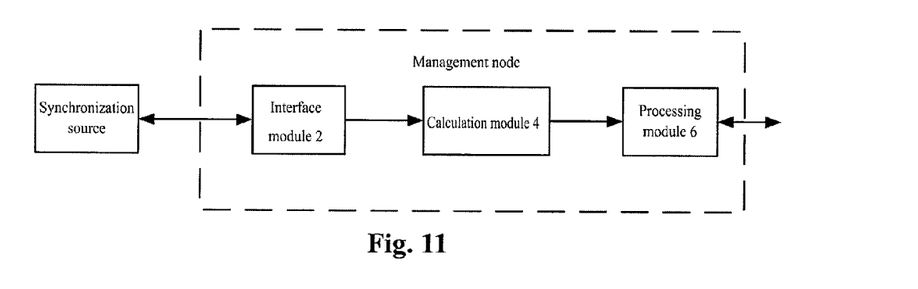
FIG. 11 illustrates a schematic structural diagram of an embodiment of a storage node in FIG. 9.

FIG. 11 illustrates a schematic structural diagram of an embodiment of the storage node in FIG. 9, and as illustrated in FIG. 11, the storage node in the present embodiment includes:

a temporary synchronization module 1 configured to be temporarily synchronized to a corresponding management node selected in a corresponding domain of a distributed system, i.e., a management node in a domain to which the storage node belongs;

a storage module 3 configured to store data of the distributed system and the synchronized time, where the data may include time identification information and/or operation version identification information, and the time identification information may include the transmission time and/or the reception time of the data; and a version control module 5 configured to perform version control on copies of the stored data according to the synchronized time, particularly version control on multiple copies of the requested data when the storage node is a front end node receiving a data modification, retrieval or recovery request.

In the present embodiment, the storage module 3 may further store the operation version identification information of the data, that is, the transmission time, the reception time and the data version information (e.g., the number of times of being modified) may be stored correspondingly in each of the copies of the data.

In the distributed system, a certain node may be taken not only as a management node or a storage node or a front end node but also as a combination thereof. For example, a certain node is selected as a management node in a domain during temporal synchronization and may join into the domain as a normal storage node after temporal synchronization and also may be taken as a front end node for version control if it is the node first receiving a request message from outside of the system. Therefore in the distributed system in the respective embodiments of the invention, a management node and a storage node may be integrated onto the same node, which functions differently in different processes. The foregoing respective embodiments of the method may be implemented in the management node and the storage node as structured in the structural diagrams of FIGS. 10 and 11, and if a certain node functions as a management node and a storage node in different processes, correspondingly the node is provided with both the internal functional modules of the management node in FIG. 10 and those of the storage node in FIG. 11.

In summary, the foregoing one or more embodiments of the invention have the following advantages.

1. Good Extensibility

In the version control method of copies and the distributed version control system according to the respective embodiments of the invention, neither high degree of clock synchronization nor a centralized control point configured to perform strict version synchronization of the copies is required, so the system can exhibit good extensibility to the outside and be applied to a large-scale distributed redundant storage system at the hundred thousand-scale to thereby achieve good extensibility of the system.

2. Good Usefulness of the System

In the respective embodiments of the invention, inconsistency between versions of the multiple copies is allowed in the system, and with the novel version control method, the system can distinguish automatically which of the copies of the data represents the latest version of the data and provide the latest data to a requester, and even if some of the copies are inaccurate, the system still can retrieve and modify the data normally and select and provide the latest one of the copies to the user, thereby achieving error tolerance of and improving applicability of the system.

3. High Automatization of the Clock Synchronization Method

Clock synchronization is required for the respective nodes throughout the network in the respective embodiments of the invention, but considerable manual configuration is required in terms of an effort of directly applying the existing solution to such a large-scale network as a D-HSS. Therefore, the invention proposes a novel clock synchronization method so that effective clock synchronization can still be performed with a high degree of automatization without manual configuration even if the number of nodes is increased to the ten thousand-scale or hundred thousand-scale, and also this version control method is less demanding for hardware.

4. High Reliability

In the version control method and system according to the invention, clock synchronization is performed with a management node so that the distributed redundant storage system can still be kept highly efficient with high reliability of 99.999% even if it is extended to the hundred thousand-scale.

Those ordinarily skilled in the art can appreciate that all or a part of the operations in the foregoing embodiments of the method may be performed by program instructing relevant hardware, which may be stored in a computer readable storage medium and which, when being executed, may perform the operations in the foregoing embodiments of the method, where the storage medium includes various media capable of storing program codes, e.g., an ROM, an RAM, a magnetic disk, or an optical disk.

Finally it shall be noted that the foregoing description is merely illustrative of the preferred embodiments of the invention but not intended to limit the scope, and although the invention has been described in details in connection with the foregoing embodiments, those skilled in the art can modify the technical solutions recited in the foregoing respective embodiments or substitute equivalently a part of the technical features therein. Any modifications, equivalent substitutions, adaptations, etc., made without departing from the principle of the invention shall come into the scope of the invention.

The invention claimed is:

1. A method for version control in a distributed system, comprising:
   selecting a management node in each of domains of the distributed system;
   selecting one of the management nodes as a synchronization source of the distributed system and temporarily synchronizing the respective management nodes according to time of the synchronization source;
   controlling, by the respective management nodes, temporal synchronization of nodes in corresponding domains according to the synchronized time; and
   performing, by the nodes of the distributed system, version control on copies of stored data according to the synchronized time,
   wherein performing version control on the copies of the stored data comprises:
   modifying, retrieving or recovering N copies of the data, wherein W+R>N and N>=3, W is the least number of responses of successful modification received from the nodes where the copies are located, and R is the least number of retrieved copies with the same contents.

2. The method of claim 1, further comprising:
   adding time identification information and operation version identification information to data stored in the distributed system and performing version control on multiple copies of the stored data according to the time identification information and the operation version identification information.

3. The method of claim 2, wherein the time identification information comprises transmission time and reception time.

4. The method of claim 1, wherein modifying the N copies of the data comprises:
   adding, by a front end node receiving a modification request corresponding to the data, transmission time to the modification request, and forwarding the modification request to nodes where the N copies of the data are located, wherein the transmission time is the time when the front end node transmits the modification request with reference to its own clock; and
   updating the data and the corresponding transmission time when nodes where more than W copies are located accept the modification request.

5. The method of claim 4, further comprising: when the nodes where more than W of copies are located accept the modification request,
   updating reception time of the modification request; and/or
   updating operation version identification information of the data.

6. The method of claim 4, further comprising:
   when the nodes where more than W copies located fail to accept the modification request, instructing by the front end node the nodes where the N copies are located to recover the data prior to the modification request failure.

7. The method of claim 1, wherein retrieving the N copies of the data comprises:
   forwarding, by a front end node receiving a retrieval query request corresponding to the data, the query request to the nodes where the N copies of the data are located; and
   returning, by the front end node, a query result of the data when nodes where more than R copies are located return the same data.

8. The method of claim 7, wherein retrieving the N copies of the data further comprises:
   acquiring and returning to the front end node, by the nodes where the N copies of the data are located, the data and corresponding time identification information; and
   determining, by the front end node, from the time identification information whether the returned data is the same.

9. The method of claim 8, wherein retrieving the N copies of the data further comprises:
   acquiring and returning to the front end node, by the nodes where the N copies of the data are located, operation version identification information corresponding to the data; and
   determining, by the front end node, from the operation version identification information whether the returned data is the same.

10. The method of claim 1, wherein recovering the N copies of the data comprises:
    transmitting, by a failure-recovered node, a synchronization request to nodes where the other N−1 copies of the data are located; and
    performing synchronization according to the latest data upon reception of a number R of returned responses of the data.

11. The method of claim 10, wherein the latest data is the data with the most recent operation version, the latest transmission time of the data and/or the shortest relative storage period of time of the data, and the relative storage period of time is a time difference between reception time and transmission time of the data.

12. The method of claim 1, wherein selecting a management node in each of domains of the distributed system comprises:
    selecting one of nodes in each of domains with the lowest or largest ID number or the longest online duration as a management node in the domain.

13. The method of claim 1, wherein selecting a management node in each of domains of the distributed system comprises:
    announcing, by one of nodes in each of domains, a request message for being a management node to the other nodes; and
    taking the node transmitting the request message as a management node of the domain when the other nodes return corresponding request acceptance responses.

14. The method of claim 1, wherein selecting one of the management nodes as a synchronization source of the distributed system comprises:
    selecting one of the management nodes with the longest online duration as the synchronization source.

15. The method of claim 1, wherein temporarily synchronizing the respective management nodes to time of the synchronization source comprises:

transmitting, by the management node, to the synchronization source a synchronization request message carrying request time T1 with reference to a time system of the management node;

responding, by the synchronization source, with a corresponding request response message carrying reception time T2 of the request message and time T3 of responding to the request message with reference to a time system of the synchronization source; and calculating, by the management node, a difference $\phi$ relative to the time system of the synchronization source as $\theta=(T2-T1)-(T4-T3)/2$ from reception time T4 when the request response message is received and the time T1, T2 and T3.

* * * * *

UNITED STATES PATENT AND TRADEMARK OFFICE
CERTIFICATE OF CORRECTION

PATENT NO. : 8,538,923 B2
APPLICATION NO. : 13/139455
DATED : September 17, 2013
INVENTOR(S) : Haiqiang Xue et al.

It is certified that error appears in the above-identified patent and that said Letters Patent is hereby corrected as shown below:

In the Claims

Column 19, claim 15, line 10, delete the symbol "$\Phi$" and replace with -- $\theta$ --.

Column 19, claim 15, line 12, delete the equation reading "$\theta=(T2-T1)-(T4-T3)/2$" and replace with -- $\theta=((T2-T1)-(T4-T3))/2$ --.

Signed and Sealed this
Twenty-second Day of October, 2013

Teresa Stanek Rea
*Deputy Director of the United States Patent and Trademark Office*